(12) United States Patent
Matsuoka

(10) Patent No.: US 11,821,519 B2
(45) Date of Patent: Nov. 21, 2023

(54) SEAL DEVICE

(71) Applicant: Eagle Industry Co., Ltd., Tokyo (JP)

(72) Inventor: Iwao Matsuoka, Tokyo (JP)

(73) Assignee: EAGLE INDUSTRY CO., LTD.

( * ) Notice: Subject to any disclaimer, the term of this patent is extended or adjusted under 35 U.S.C. 154(b) by 3 days.

(21) Appl. No.: 17/610,370

(22) PCT Filed: May 11, 2020

(86) PCT No.: PCT/JP2020/018852
§ 371 (c)(1),
(2) Date: Nov. 10, 2021

(87) PCT Pub. No.: WO2020/235380
PCT Pub. Date: Nov. 26, 2020

(65) Prior Publication Data
US 2022/0221059 A1 Jul. 14, 2022

(30) Foreign Application Priority Data
May 17, 2019 (JP) .................................. 2019-093953

(51) Int. Cl.
F16J 15/3232 (2016.01)
(52) U.S. Cl.
CPC .................................. F16J 15/3232 (2013.01)
(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 4,395,141 A  7/1983  Pietsch et al. .......... F16C 33/74
4,984,811 A  1/1991  Kuwabara et al. ..... F16K 41/00
(Continued)

FOREIGN PATENT DOCUMENTS

EP  3241736   11/2017  ............. B63H 23/06
JP  58-32099   8/1956
(Continued)

OTHER PUBLICATIONS

Official Action issued in related European Application Serial No. 20810157.6, dated Dec. 21, 2022, 6 pgs.
(Continued)

Primary Examiner — Nathan Cumar
(74) Attorney, Agent, or Firm — HAYES SOLOWAY P.C.

(57) ABSTRACT

A seal device 1 includes first seal part facing an external fluid and second seal part arranged in parallel to the first seal part and facing a sealed fluid in an interior of equipment to prevent entry of the external fluid and leakage of a sealed fluid. Intermediate seal part is arranged in parallel to the first seal part and the second seal part between the first seal part and the second seal part. A gas chamber is formed between the first seal part and the intermediate seal part, to which a gas having a higher pressure than the external fluid is supplied. An intermediate chamber is formed between the intermediate seal part and the second seal part, to which a gas having a lower pressure than the gas supplied to the gas chamber and having lower pressure than the sealed fluid is supplied.

19 Claims, 6 Drawing Sheets

(58) Field of Classification Search
CPC .. F16J 15/3208; F16J 15/3212; F16J 15/3216; F16J 15/322
USPC .......................................................... 277/562
See application file for complete search history.

(56) References Cited

U.S. PATENT DOCUMENTS

| | | | |
|---|---|---|---|
| 2010/0013167 A1 | 1/2010 | Bachhofner et al. | .... F16J 15/32 |
| 2011/0304102 A1* | 12/2011 | Yoshida | ............... B63H 23/321 277/549 |
| 2019/0011050 A1* | 1/2019 | Vincent | ................ F16J 15/3232 |

FOREIGN PATENT DOCUMENTS

| | | | |
|---|---|---|---|
| JP | 57-179471 | 11/1982 | ............... F16J 15/16 |
| JP | 1-148171 | 10/1989 | ............... F16J 15/32 |
| JP | 7-242197 | 9/1995 | ............. B63H 23/36 |
| JP | 11-304005 | 11/1999 | ............... F16J 15/32 |
| JP | 2000-238694 | 9/2000 | ............. B63H 23/36 |
| JP | 2005041348 A * | 2/2005 | |
| JP | 2006-234101 | 9/2006 | ............... F16J 15/18 |

OTHER PUBLICATIONS

International Search Report and Written Opinion issued in related PCT International Application Serial No. PCT/JP2020/018852, dated Jul. 14, 2020, 14 pages.
International Preliminary Report on Patentability issued in related PCT International Application Serial No. PCT/JP2020/018852, dated Dec. 2, 2021, 6 pages.
Korean Official Action Issued in corresponding Korean patent Application Serial No. 10-2021-7037548, dated Mar. 28, 2023, with translation, 11 pages.

* cited by examiner

SEAL DEVICE

TECHNICAL FIELD

The present invention relates to a seal device that seals a relative rotation portion in a rotating machine suitable for a propulsion machine of a ship or a tidal current generator, or the like.

BACKGROUND ART

Conventionally, a seal device provided in a rotating machine included in a propulsion machine of a ship or a tidal current generator, or the like seals an annular gap formed at a relative rotation portion to prevent a sealed fluid such as lubricating oil, or the like in an interior of equipment from leaking to the outside of equipment and to prevent an external fluid such as seawater from entering the interior of equipment.

For example, a seal device suitable for a propulsion machine of a ship disclosed in Patent Citation 1 is held by a housing with a shaft hole, through which a rotating shaft for propulsion extends, and includes three seal rings being in sliding contact with an outer peripheral surface of a liner fitted onto the rotating shaft and provided in parallel to one another in an axial direction. Air is supplied to a primary annular chamber formed between a pair of the seal rings provided on an outboard side among the seal rings, and lubricating oil is supplied to a secondary annular chamber formed between a pair of the seal rings provided on an inboard side. Specifically, the air supply is adjusted so that the primary annular chamber maintains an internal pressure of a seawater pressure plus a tightening pressure on the seal ring, and the supply of lubricating oil is adjusted so that the secondary annular chamber has an internal pressure required to blow out the air supplied to the primary annular chamber through the seal rings to the outboard side, so that the internal pressures in the primary annular chamber and the secondary annular chamber are constantly adjusted according to fluctuations in seawater pressure. Accordingly, a response to fluctuations in seawater pressure is high, and entry of seawater into the ship can be prevented.

CITATION LIST

Patent Literature

Patent Citation 1: JP 11-304005 A (Page 4, FIG. 2)

SUMMARY OF INVENTION

Technical Problem

However, the seal device in Patent Citation 1 blows the air from the primary annular chamber to the outboard side by utilizing the internal pressure in the secondary annular chamber, to which the lubricating oil is supplied, to prevent the entry of seawater into the ship, and the internal pressure in the secondary annular chamber is constantly adjusted so as to be higher than the internal pressure in the primary annular chamber. Accordingly, in case of failure of the seal rings, the high-pressure lubricating oil in the secondary annular chamber may enter the primary annular chamber through the seal rings, and the lubricating oil may be blown out from the primary annular chamber to the low-pressure outboard side together with the air to cause leakage of the lubricating oil to the outside of the ship.

The present invention has been made in view of such problems, and an object of the present invention is to provide a seal device capable of reliably preventing leakage of a sealed fluid to the outside of equipment.

Solution to Problem

In order to the problems described above, a seal device according to the present invention is a seal device provided at a portion where relative rotation occurs between a first member and a second member that rotates relative to the first member, comprising a first seal part facing an external fluid and a second seal part arranged in parallel to the first seal part and facing a sealed fluid in an interior of equipment to prevent entry of the external fluid and leakage of the sealed fluid, wherein the seal device further comprises an intermediate seal part arranged in parallel to the first seal part and the second seal part between the first seal part and the second seal part, a gas chamber is formed between the first seal part and the intermediate seal part, to which a gas having a higher pressure than the external fluid is supplied, and an intermediate chamber is formed between the intermediate seal part and the second seal part, to which a gas having a lower pressure than the gas supplied to the gas chamber and having a lower pressure than the sealed fluid is supplied. According to the aforesaid feature of the present invention, in case of failure in which the sealed fluid facing the second seal part enters the intermediate chamber through this second seal part, this sealed fluid can be stored in the intermediate chamber lower in pressure than the adjacent gas chamber on the equipment exterior side. Accordingly, leakage of the sealed fluid to the outside of equipment can be reliably prevented.

It may be preferable that the second seal part is a lip seal, and be arranged so that a lip portion thereof is pressed against the second member by the sealed fluid. According to this preferable configuration, the pressure of the sealed fluid having a higher pressure than the gas in the intermediate chamber can act as a tightening pressure on the lip seal, so that the sealed fluid is less likely to enter the intermediate chamber.

It may be preferable that the intermediate chamber may communicate with a collection chamber through a communication passage. According to this preferable configuration, the sealed fluid that has entered the intermediate chamber is collected in the collection chamber through the communication passage, so that the sealed fluid in the intermediate chamber can be easily discharged to the collection chamber that is a separate chamber. Accordingly, the leakage of the sealed fluid to the outside of equipment can be further prevented.

It may be preferable that the communication passage may be provided with a check valve that prevents backflow to a side of the intermediate chamber. According to this preferable configuration, the sealed fluid collected in the collection chamber can be prevented from flowing back into the intermediate chamber through the communication passage.

It may be preferable that the gas supplied to the intermediate chamber is a pressure-controlled compressed gas. According to this preferable configuration, the differential pressure between the pressure-controlled compressed gas and the gas supplied to the gas chamber and the differential pressure between the pressure-controlled compressed gas and the sealed fluid can be properly maintained.

It may be preferable that the compressed gas is compressed air. According to this preferable configuration, it is easy to handle, and safety can be ensured.

It may be preferable that the sealed fluid is controlled to have a lower pressure than the external fluid. According to this preferable configuration, the sealed fluid that has entered the intermediate chamber is less likely to leak to the outside of equipment.

DESCRIPTION OF EMBODIMENTS

Modes for carrying out a seal device according to the present invention will be described below based on embodiments.

First Embodiment

Figure 4:
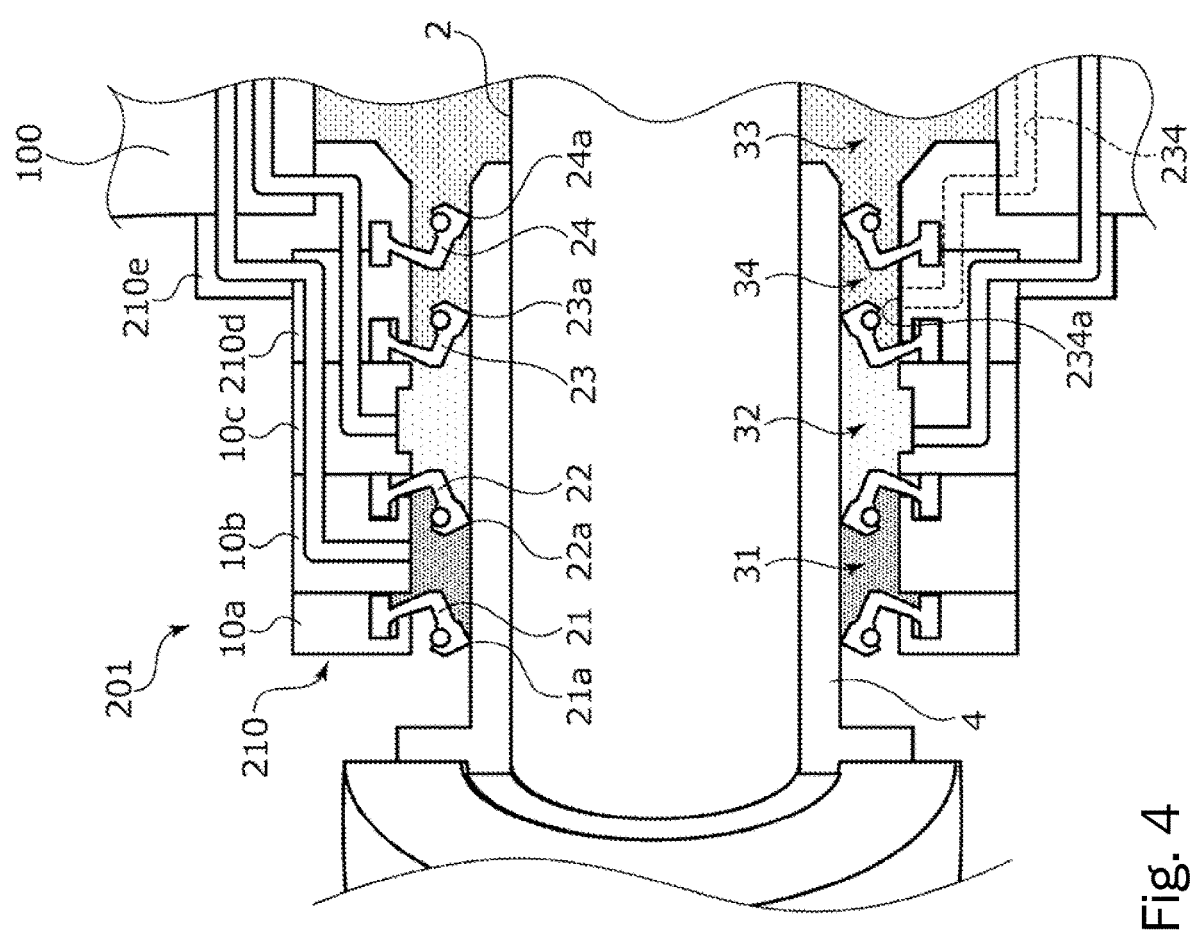
FIG. 4 is an enlarged schematic view showing the seal device according to the second embodiment.

A seal device according to a first embodiment of the present invention will be described with reference to FIGS. 1 and 2. In this embodiment, a seal device for a ship propulsion machine will be described as an example. Further, the left side of the drawing sheets of FIGS. 1 and 2 will be described as a stern side (e.g., an outboard side) of the seal device, and the right side of the drawing sheets of FIGS. 1 and 2 will be described as a bow side (e.g., an inboard side) of the seal device. In FIGS. 2 and 4, hatching a housing, and the like is omitted, and the compressed air and the lubricating oil that are supplied to and stored in each chamber are schematically shown by hatching.

Figure 1:
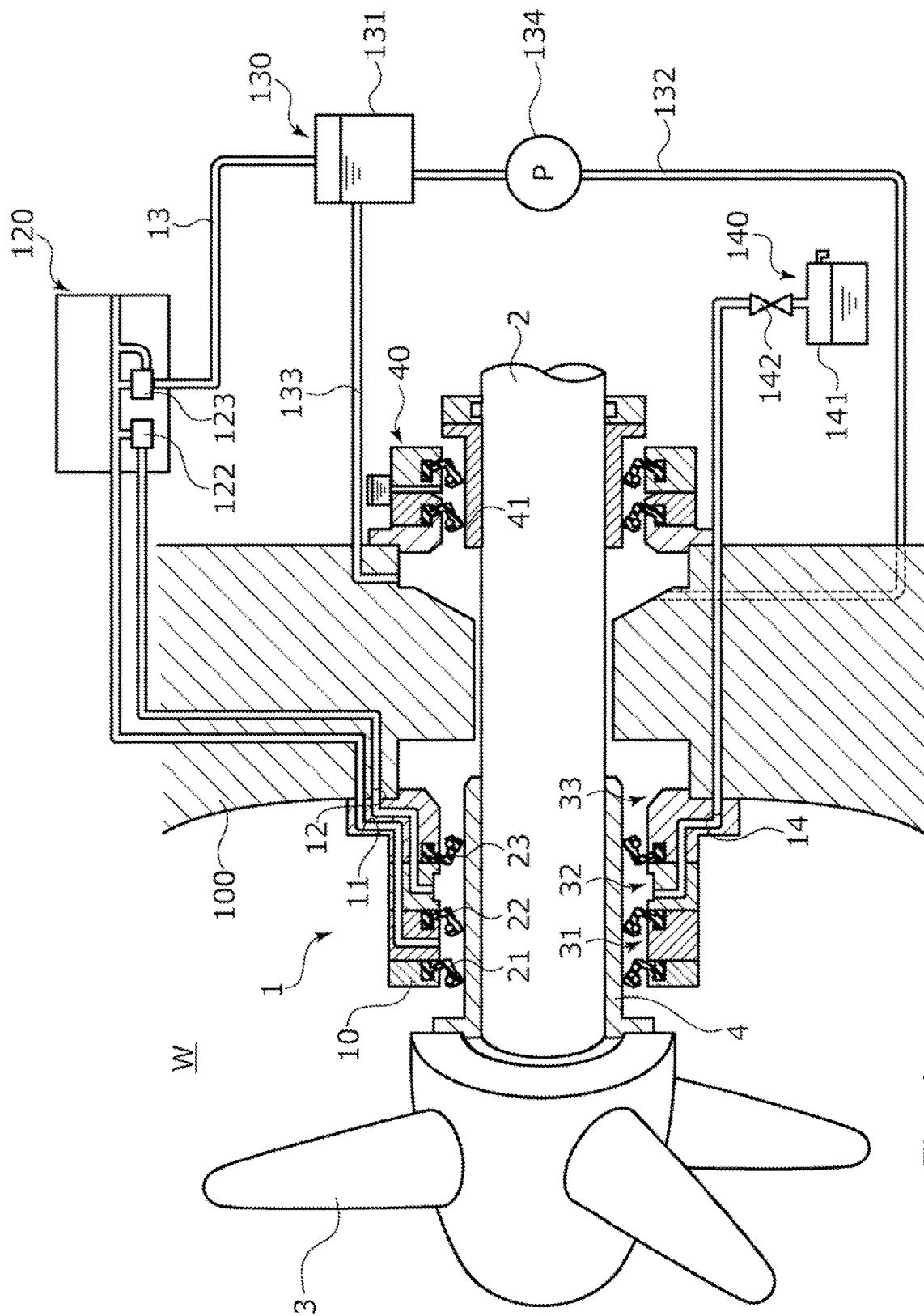
FIG. 1 is a schematic diagram illustrating a stern tube seal system with a seal device according to a first embodiment of the present invention.
Figure 2:
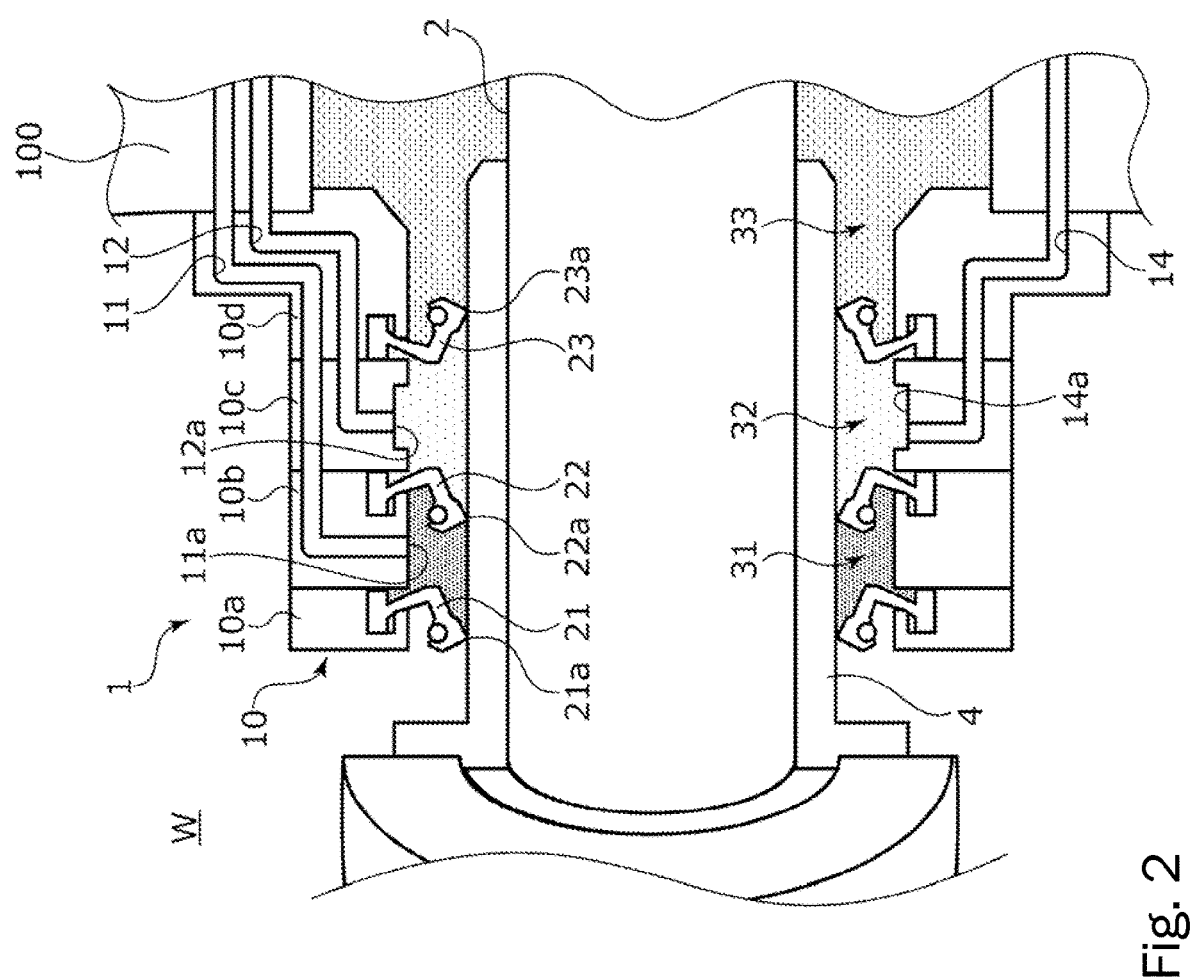
FIG. 2 is an enlarged schematic view showing the seal device according to the first embodiment.

As shown in FIG. 1, a seal device 1 according to the present invention is a shaft seal device for a ship propulsion machine, and is attached from the stern side to a stern tube 100, through which a propeller shaft 2 with a propeller 3 for propulsion extends. The seal device 1 is used to prevent lubricating oil as a sealed fluid supplied to the interior of the stern tube 100 constituting a hull to lubricate the propeller shaft 2 and a bearing (not shown) from leaking to the outside of the ship, and to prevent seawater W as an external fluid from entering the interior of the ship. The seal device 1 is also connected with an air control unit 120, a lubricating oil circulation unit 130, and a collection unit 140, which are provided inboard, by respective pipelines, to constitute a stern tube seal system. Further, a seal device 40 provided inboard is attached to the stern tube 100 from the bow side, and is a shaft seal device to prevent the lubricating oil supplied to the interior of the stern tube 100 from entering a machine room. In this embodiment, the seal device 1 on the stern side will be described, and the description on the seal device 40 on the bow side will be omitted.

As shown in FIGS. 1 and 2, the seal device 1 is provided at a portion where relative rotation occurs between a housing 10 as a first member and a liner 4 that constitutes the propeller shaft 2 as a second member rotating relative to the housing 10. The seal device 1 mainly includes a first lip seal 21 as first seal part facing the outboard seawater W, a second lip seal 23 as second seal part arranged in parallel on the inboard side of the first lip seal 21 and facing lubricating oil that fills an oil chamber 33 in the stern tube 100, and an intermediate lip seal 22 as intermediate seal part arranged in parallel between the first lip seal 21 and the second lip seal 23.

As shown in FIG. 2, a first divided housing 10a, a second divided housing 10b, a third divided housing 10c, and a fourth divided housing 10d in order from the stern side are fitted to one another in an axial direction and are integrally connected with one another by bolts or the like (not shown), so that the housing 10 is formed into a substantially cylindrical shape. The housing 10 is fixed by bolts or the like (not shown) with a flange portion of the fourth divided housing 10d on the bow side being in contact with the stern tube 100 on the stern side.

Further, in the housing 10, an outer diameter portion of the first lip seal 21 is held in a substantially sealed manner between the first divided housing 10a and the second divided housing 10b, an outer diameter portion of the intermediate lip seal 22 is held in a substantially sealed manner between the second divided housing 10b and the third divided housing 10c, and an outer diameter portion of the second lip seal 23 is held in a substantially sealed manner between the third divided housing 10c and the fourth divided housing 10d.

Further, a through hole is formed in the second divided housing 10b, the third divided housing 10c, and the fourth divided housing 10d to constitute a part of a first air supply passage 11 communicating with the air control unit 120 and a first annular chamber 31 as a gas chamber. A supply port 11a in communication with the first air supply passage 11 is formed on an upper side of an inner peripheral surface of the second divided housing 10b.

Further, a through hole is formed in the third divided housing 10c and the fourth divided housing 10d to constitute a part of a second air supply passage 12 communicating with the air control unit 120 and a second annular chamber 32 as an intermediate chamber. A supply port 12a in communication with the second air supply passage 12 is formed on an upper side of an inner peripheral surface of the third divided housing 10c. In addition, a through hole is formed in the third divided housing 10c and the fourth divided housing 10d to constitute a part of a communication passage 14 communicating with the second annular chamber 32 and the collection unit 140. A discharge port 14a in communication with the communication passage 14 is formed on a lower side of an inner peripheral surface of the third divided housing 10c.

As shown in FIG. 2, the lip seals 21, 22, and 23 are made of an elastic material such as fluoro-rubber or nitrile rubber that has excellent water resistance and oil resistance. Each of the lip seals 21, 22, and 23 according to this embodiment has a well-known configuration, and detailed description thereof will be omitted.

Further, the lip seals 21, 22, and 23 are arranged in parallel in the axial direction with their outer diameter portions held in a substantially sealed manner in the housing 10. Respective inner peripheral surfaces of lip portions 21a, 22a, and 23a extending on the inner diameter side and extending in the axial direction toward the high pressure side are in sliding contact with an outer peripheral surface of the liner 4 fitted onto the propeller shaft 2, so that the first annular chamber 31 is formed between the first lip seal 21 and the intermediate lip seal 22, and the second annular chamber 32 is formed between the intermediate lip seal 22 and the second lip seal 23. Further, the annular oil chamber 33 is formed between the second lip seal 23 and a lip seal 41 on the stern side of the seal device 40 on the bow side.

The first annular chamber 31 is supplied with compressed air as a compressed gas adjusted so as to have a higher pressure than the seawater W from the air control unit 120 through the first air supply passage 11. Further, the second annular chamber 32 is supplied with compressed air as a compressed gas adjusted so as to have a lower pressure than the compressed air supplied from the air control unit 120 to the first annular chamber 31 through the second air supply passage 12, and so as to have a lower pressure than the lubricating oil supplied from the lubricating oil circulation unit 130 to the oil chamber 33 in the stern tube 100.

Further, the first lip seal 21 provided on the stern side of the first annular chamber 31 is arranged so that the lip portion 21a thereof faces the outboard side, and the seawater pressure $P_W$ acts as a part of a tightening pressure on the lip portion 21a. Further, the intermediate lip seal 22 provided on the bow side of the first annular chamber 31 and on the stern side of the second annular chamber 32 is arranged so that the lip portion 22a thereof faces the outboard side, that is, the side of the first annular chamber 31, and an air pressure $P_1$ in the first annular chamber 31 acts as a part of a tightening pressure on the lip portion 22a. Further, the second lip seal 23 provided on the bow side of the second annular chamber 32 is arranged so that the lip portion 23a thereof faces the inboard side, that is, the side of the stern tube 100, and a hydraulic pressure $P_O$ in the oil chamber 33 in the stern tube 100 acts as a part of a tightening pressure on the lip portion 23a.

Next, the air control unit 120, the lubricating oil circulation unit 130, and the collection unit 140 that constitute the stern tube seal system together with the seal device 1 will be described.

As shown in FIG. 1, the air control unit 120 is a unit that supplies the compressed air supplied from a compressor (not shown) provided inboard, whose pressure is adjusted by a pressure reducing valve, a flow rate control valve, or the like (not shown), to the first annular chamber 31, the second annular chamber 32, and a lubricating oil tank 131 of the lubricating oil circulation unit 130 described later, through the first air supply passage 11, the second air supply passage 12, and the third air supply passage 13.

Specifically, the air control unit 120 adjusts the air pressure $P_1$ in the first annular chamber 31 so that the air pressure $P_1$ always exceeds the seawater pressure $P_W$ in accordance with the seawater pressure $P_W$ that presses the lip portion 21a of the first lip seal 21 arranged on the stern side of the first annular chamber 31.

The seawater pressure $P_W$ fluctuates according to the draft of the ship, and the air control unit 120 adjusts the air pressure in accordance with such fluctuations in seawater pressure μW. Further, the signal corresponding to the seawater pressure $P_W$, that is, the signal corresponding to the air pressures in the first air supply passage 11 and the first annular chamber 31 is output to a pressure reducing valve 122 that is as a part of the air control unit 120 and is provided at the branch portion between the first air supply passage 11 and the second air supply passage 12. A part of the compressed air is supplied to the second annular chamber 32 through the second air supply passage 12 as compressed air having the air pressure $P_2$ that has been reduced based on the output signal during the passage through the pressure reducing valve 122 so as to be lower than the air pressure $P_1$ of the compressed air supplied to the first annular chamber 31 and so as to be a lower than the hydraulic pressure $P_O$ of the lubricating oil supplied to the oil chamber 33 in the stern tube 100 by a preset differential pressure.

The lubricating oil circulation unit 130 is a unit that supplies lubricating oil from the lubricating oil tank 131 provided inboard to the interior of the stern tube 100 through a first lubricating oil circulation passage 132 with a pump 134, and again returns the lubricating oil from the interior of the stern tube 100 to the lubricating oil tank 131 through a second lubricating oil circulation passage 133 to circulate the lubricating oil. The signal corresponding to the seawater pressure $P_W$ is output to a pressure reducing valve 123 that is a part of the air control unit 120 and is provided at the branch portion between the first air supply passage 11 and the third air supply passage 13. A part of the compressed air is adjusted based on the output signal during passing through the pressure reducing valve 123 so as to have a higher pressure than the air pressure $P_2$ of the compressed air supplied to the second annular chamber 32, and so as to have a lower pressure than the seawater pressure $P_W$ by a preset differential pressure or so as to have the same pressure as the seawater pressure $P_W$, and is then supplied to the lubricating oil tank 131 through the third air supply passage 13. Accordingly, the lubricating oil in the lubricating oil tank 131 is brought into contact with the such pressure-reduced compressed air with the oil surface as a boundary surface, so that the hydraulic pressure $P_O$ of the lubricating oil in the lubricating oil tank 131 is adjusted so as to be higher than the air pressure $P_2$ of the second annular chamber 32 and so as to be lower than or be the same as the seawater pressure $P_W$.

That is, the seawater pressure $P_W$, the air pressure $P_1$ in the first annular chamber 31, the air pressure $P_2$ in the second annular chamber 32, and the hydraulic pressure $P_O$ in the oil chamber 33 are adjusted so that the air pressure $P_1$>the seawater pressure $P_W$≥the hydraulic pressure $P_O$>the air pressure $P_2$ is always satisfied.

The collection unit 140 is a unit that in case of failure in which lubricating oil enters the second annular chamber 32 from the oil chamber 33 in the stern tube 100, collects this lubricating oil in a collection chamber 141 provided inboard through the communication passage 14. Further, the communication passage 14 is provided with a check valve 142 to prevent the lubricating oil collected in the collection chamber 141 from flowing back into the second annular chamber 32.

As described above, in the seal device 1 according to this embodiment, the compressed air, whose pressure has been reduced to the air pressure $P_2$ by the air control unit 120 so as to be lower than the air pressure $P_1$ of the compressed air supplied to the first annular chamber 31 through the first air supply passage 11, is supplied to the second annular chamber 32 through the second air supply passage 12. Accordingly, even in case of failure in which the lubricating oil in the oil chamber 33 facing the second lip seal 23 enters the second annular chamber 32 through the second lip seal 23, the lubricating oil that has the air pressure $P_2$ lower than that in the adjacent first annular chamber 31 on the outboard side and has entered the second annular chamber 32, can be retained, and the leakage of the lubricating oil to the outside of the ship can be reliably prevented.

In addition, the lip portion 22a of the intermediate lip seal 22 provided on the stern side of the second annular chamber 32 is arranged so as to face the side of the first annular chamber 31, so that the lip portion 22a of the intermediate lip seal 22 is pressed radially inward toward the outer peripheral surface of the liner 4 due to the differential pressure between the air pressure $P_1$ in the first annular chamber 31 and the air pressure $P_2$ in the second annular chamber 32 to seal the lubricating oil. Accordingly, the lubricating oil that has entered the second annular chamber 32 is prevented from entering the first annular chamber 31, and the leakage of the lubricating oil to the outside of the ship can be further prevented.

Further, in case of failure in which the lubricating oil in the oil chamber 33 in the stern tube 100 enters the second annular chamber 32 through the second lip seal 23, the lubricating oil that has entered the second annular chamber 32 is collected in the inboard collection chamber 141 through the communication passage 14. Accordingly, the lubricating oil can be easily discharged from the interior of the second annular chamber 32, so that the leakage of the lubricating oil to the outside of the ship can be further prevented.

Further, the pressure of the lubricating oil supplied from the lubricating oil circulation unit 130 to the oil chamber 33 in the stern tube 100 is reduced so as to be lower than the seawater pressure $P_W$ by a preset differential pressure, so that the hydraulic pressure $P_O$ in the oil chamber 33 is controlled to be lower than the seawater pressure µW. Accordingly, even if the lubricating oil enters the second annular chamber 32, it is less likely to leak to the outside of the ship.

Further, the pressure of the compressed air supplied from the air control unit 120 to the second annular chamber 32 is reduced so as to be lower than that of the lubricating oil supplied to the oil chamber 33 in the stern tube 100 by a preset differential pressure, so that the lip portion 23a of the second lip seal 23 is pressed radially inward toward the outer peripheral surface of the liner 4 due to the differential pressure between the pressure in the second annular chamber 32 and the pressure in the oil chamber 33 to seal the lubricating oil. Accordingly, the lubricating oil supplied to the oil chamber 33 can be prevented from entering the second annular chamber 32. In addition, the compressed air supplied to the second annular chamber 32 can be also prevented from entering the oil chamber 33.

Further, the second annular chamber 32 is supplied with the pressure-adjusted compressed air through the air control unit 120, and the differential pressure from the compressed air supplied to the first annular chamber 31 or from the lubricating oil supplied into the oil chamber 33 can be properly maintained. The load particularly on the intermediate lip seal 22 and the second lip seal 23 that constitute the second annular chamber 32 can be maintained substantially constant, and their long life can be extended.

Further, since the first annular chamber 31 and the second annular chamber 32 are supplied with the compressed air through the air control unit 120, it is easy to handle and safety can be ensured.

Further, the compressed air whose pressure is adjusted so as to be air pressure $P_1$ equal to or higher than the seawater pressure $P_W$ in the air control unit 120 is supplied to the first annular chamber 31 through the first air supply passage 11, so that the seawater W is prevented from entering the annular chamber 31 from a gap between the lip portion 21a of the first lip seal 21 and the liner 4. In addition, the air having the air pressure $P_1$ supplied to the first annular chamber 31 is blown from the gap between the lip portion 21a of the first lip seal 21 and the liner 4 to the outside of the ship against the seawater pressure $P_W$, so that the fluctuations in seawater pressure $P_W$ can be detected in the air control unit 120. Accordingly, other additional detection tanks or pipes are not required.

Further, the air pressure $P_2$ in the second annular chamber 32 is set to be lower than the seawater pressure $P_W$, so that the hydraulic pressure $P_O$ in the oil chamber 33 can be less than the seawater pressure $P_W$. Accordingly, pump equipment for increasing the pressure of lubricating oil or the lubricating oil tank 131 is not required to be installed at a high place, and the entire stern tube seal system can be simplified.

The second annular chamber 32 is preferably provided with a pressure control valve such as a pressure reducing valve or a relief valve so that when the high-pressure compressed air enters from the first annular chamber 31, an excess pressure can be discharged. This can prevent air from entering the oil chamber 33.

Second Embodiment

Figure 3:
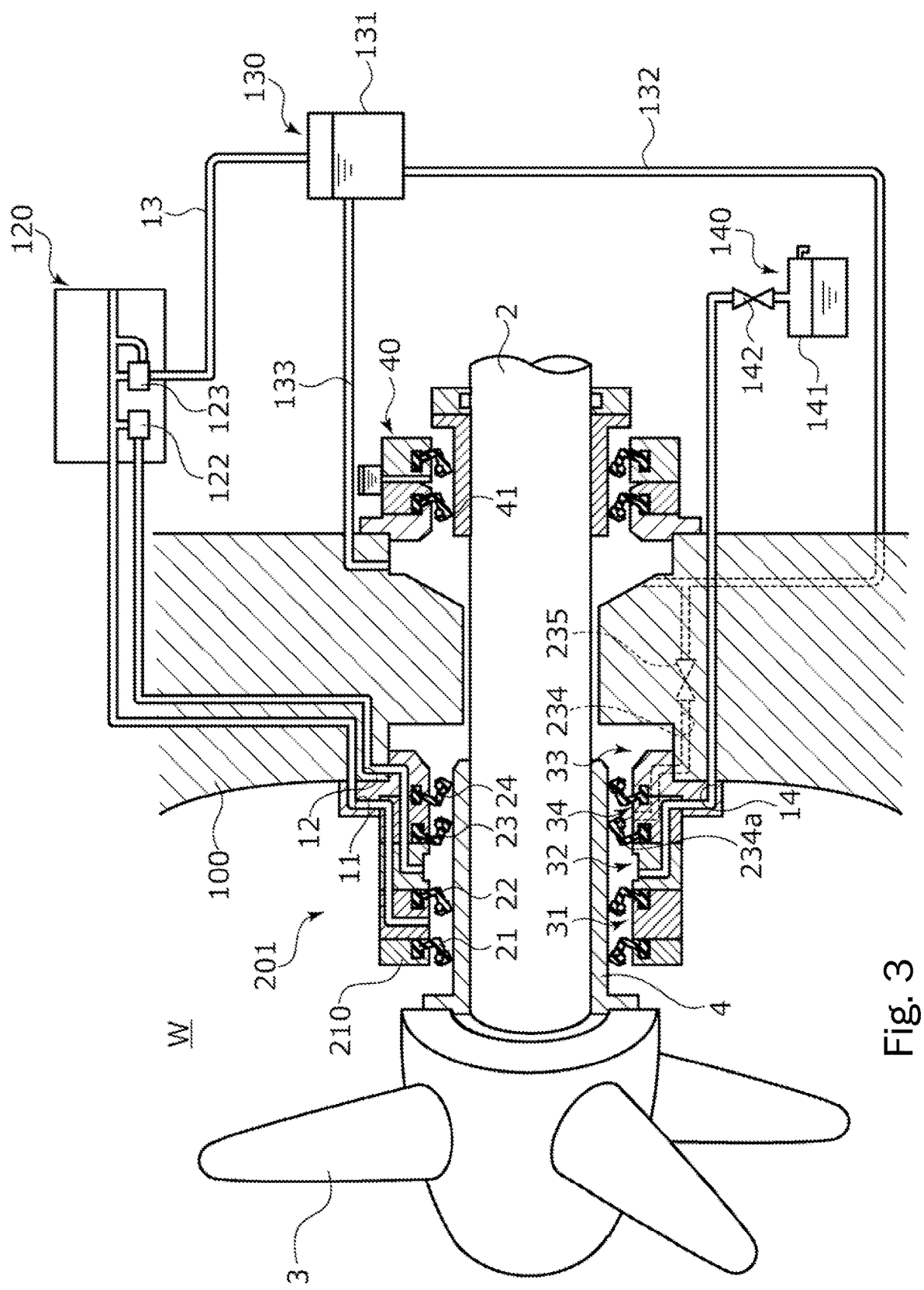
FIG. 3 is a schematic diagram illustrating a stern tube seal system with a seal device according to a second embodiment of the present invention.

Next, a seal device according to a second embodiment of the present invention will be described with reference to FIGS. 3 and 4. The same components as those shown in the embodiment described above are designated by the same reference numerals, and overlapping description will be omitted.

A seal device 201 according to the second embodiment of the present invention will be described. As shown in FIG. 3, the seal device 201 is provided at a portion where relative rotation occurs between a housing 210 as a first member and the liner 4 that constitutes the propeller shaft 2 as a second member rotating relative to the housing 210. The seal device 201 mainly includes the first lip seal 21, the intermediate lip seal 22, the second lip seal 23, and an auxiliary lip seal 24 arranged in parallel on the bow side of the second lip seal 23.

As shown in FIG. 4, the first divided housing 10a, the second divided housing 10b, the third divided housing 10c, the fourth divided housing 210d, and a fifth divided housing 210e in order from the stern side are fitted to one another in an axial direction and are integrally connected with one another by bolts or the like (not shown), so that the housing 210 is formed into a substantially cylindrical shape.

Further, an outer diameter portion of the auxiliary lip seal 24 is held in a substantially sealed manner between the fourth divided housing 210d and the fifth divided housing 210e in the housing 210. In addition, an annular second oil chamber 34 is formed between the second lip seal 23 and the auxiliary lip seal 24.

Further, a through hole is formed in the fourth divided housing 210d and the fifth divided housing 210e to constitute a part of a branch communication passage 234 that branches from the first lubricating oil circulation passage 132 extending from the lubricating oil circulation unit 130 and communicates with the second oil chamber 34. A supply port 234a in communication with the branch communication passage 234 is formed on the lower side of an inner peripheral surface of the fourth divided housing 210d. The branch communication passage 234 is provided with an on/off valve 235. Further, the lubricating oil tank 131 constituting the lubricating oil circulation unit 130 is configured as a pressurized tank capable of adjusting the pressure of the lubricating oil according to the pressure of the compressed air supplied from the air control unit 120 through the third air supply passage 13.

Further, the second lip seal 23 provided on the stern side of the second oil chamber 34 is arranged so that the lip portion 23a thereof faces the inboard side, that is, the side of the second oil chamber 34, and the hydraulic pressure $P_{O2}$ in the second oil chamber 34 acts as a part of a tightening pressure on the lip portion 23a. In addition, the auxiliary lip seal 24 provided on the bow side of the second oil chamber 34 is arranged so that the lip portion 24a thereof faces the inboard side, that is, the side of the stern tube 100, and the hydraulic pressure $P_{O1}$ in the oil chamber 33 in the stern tube 100 acts as a part of a tightening pressure on the lip portion 24a.

As described above, in the seal device 201 according to this embodiment, the lip portion 23a of the second lip seal 23 is arranged so as to face the side of the second oil chamber 34, so that the lip portion 23a of the second lip seal 23 is pressed radially inward toward the outer peripheral surface of the liner 4 due to the differential pressure between the second annular chamber 32 and the second oil chamber 34 to seal the lubricating oil. Accordingly, the lubricating oil supplied to the second oil chamber 34 can be prevented from entering the second annular chamber 32. In addition, the lubricating oil supplied from the lubricating oil circulation unit 130 to the second oil chamber 34 through the branch communication passage 234 is sealed by the second lip seal 23, so that the hydraulic pressure $P_{O2}$ in the second oil chamber 34 is equal to or higher than the hydraulic pressure $P_{O1}$ in the oil chamber 33 (i.e., the hydraulic pressure $P_{O2} \geq$ the hydraulic pressure $P_{O1}$). Accordingly, the lubricating oil can flow into the oil chamber 33 from a gap between the lip portion 24a of the auxiliary lip seal 24 and the liner 4, and the lubricating oil supplied to the second oil chamber 34 is less likely to enter the second annular chamber 32. The lubricating oil that has flowed out from the second oil chamber 34 into the oil chamber 33 returns to the lubricating oil tank 131 through the second lubricating oil circulation passage 133.

Further, since the branch communication passage 234 is provided with the on/off valve 235, switching can be made so that, for example, when the second lip seal 23 is damaged, the on/off valve 235 is closed to stop the supply of the lubricating oil to the second oil chamber 34, and the auxiliary lip seal 24 mainly seals the lubricating oil.

Figure 5:
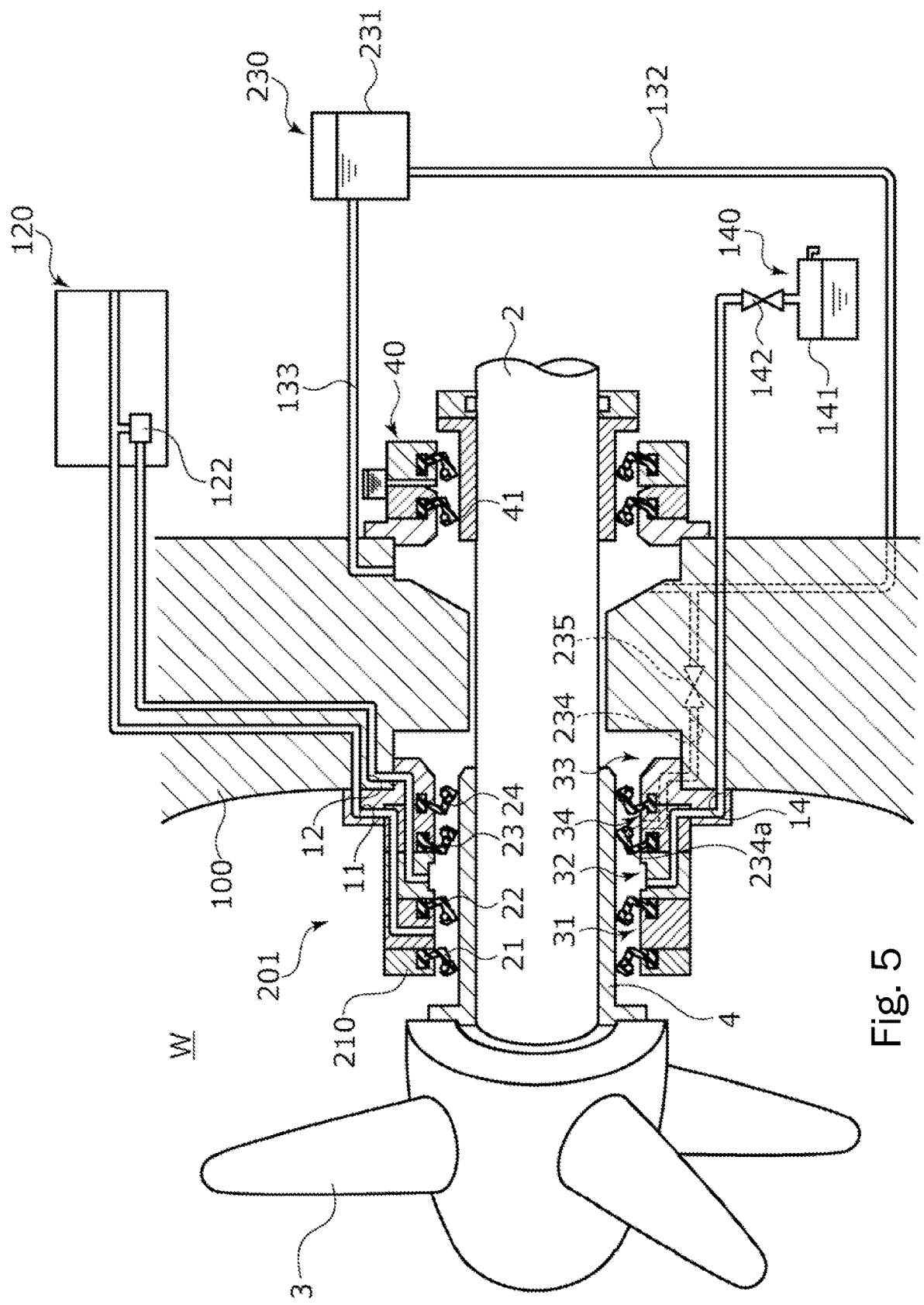
FIG. 5 is a schematic diagram illustrating a modification of the stern tube seal system with the seal device according to the second embodiment.

Further, the lubricating oil tank constituting the lubricating oil circulation unit is not limited to the one configured as a pressurized tank capable of adjusting the pressure of the lubricating oil according to the pressure of the compressed air supplied from the air control unit 120. For example, as a modification of the stern tube seal system with the seal device 201 according to the second embodiment, as shown in FIG. 5, a lubricating oil tank 231 constituting a lubricating oil circulation unit 230 may be configured as a gravity tank that supplies the lubricating oil at a constant pressure by gravity. The lubricating oil circulation unit 230 shown in FIG. 5 may be applied to the stern tube seal system with the seal device 1 according to the first embodiment.

Third Embodiment

Next, a seal device according to a third embodiment of the present invention will be described with reference to FIG. 6. The same components as those shown in the embodiments described above are designated by the same reference numerals, and overlapping description will be omitted. In this embodiment, a seal device for a center-open type tidal current generator will be described as an example. Further, the left side of the drawing sheet of FIG. 6 will be described as an inner diameter side of the seal device, and the right side of the drawing sheet of FIG. 6 will be described as an outer diameter side of the seal device.

A seal device 301 according to the third embodiment of the present invention will be described. As shown in FIG. 6, the seal device 301 for a center-open type tidal current generator prevents the lubricating oil from flowing to the outside of equipment, which is supplied to the interior of equipment in order to lubricate a pair of bearings 304, 304 provided between an annular rotor 302 including a plurality of blades 303 on the inner peripheral surface and an annular power generation unit 307 arranged on the outer diameter side of the rotor 302 and including a coil 306, and prevents the seawater W from entering the interior of equipment. The rotor 302 is provided with a magnet 305 extending in the circumferential direction of the outer peripheral surface, and the rotor 302 that has received the tidal current from the blades 303 rotates relative to the power generation unit 307 to generate power.

The seal device 301 is provided at a portion where relative rotation occurs between a pair of annular housings 310, 310 as first members attached from the inner diameter side to a pair of annular casings 300, 300 arranged in front of and in back of the rotor 302 and the power generation unit 307, and the rotor 302 as a second member rotating relative to the housings 310, 310. The seal device 301 mainly includes a pair of annular first lip seals 321, 321 as a first seal part facing the seawater W, a pair of second lip seals 323, 323 as a second seal part arranged in parallel to the first lip seals 321, 321, respectively, and facing the lubricating oil in the interior of equipment, and intermediate lip seals 322, 322 as an intermediate seal part arranged in parallel between the first lip seals 321, 321 and the second lip seals 323, 323, respectively.

Figure 6:
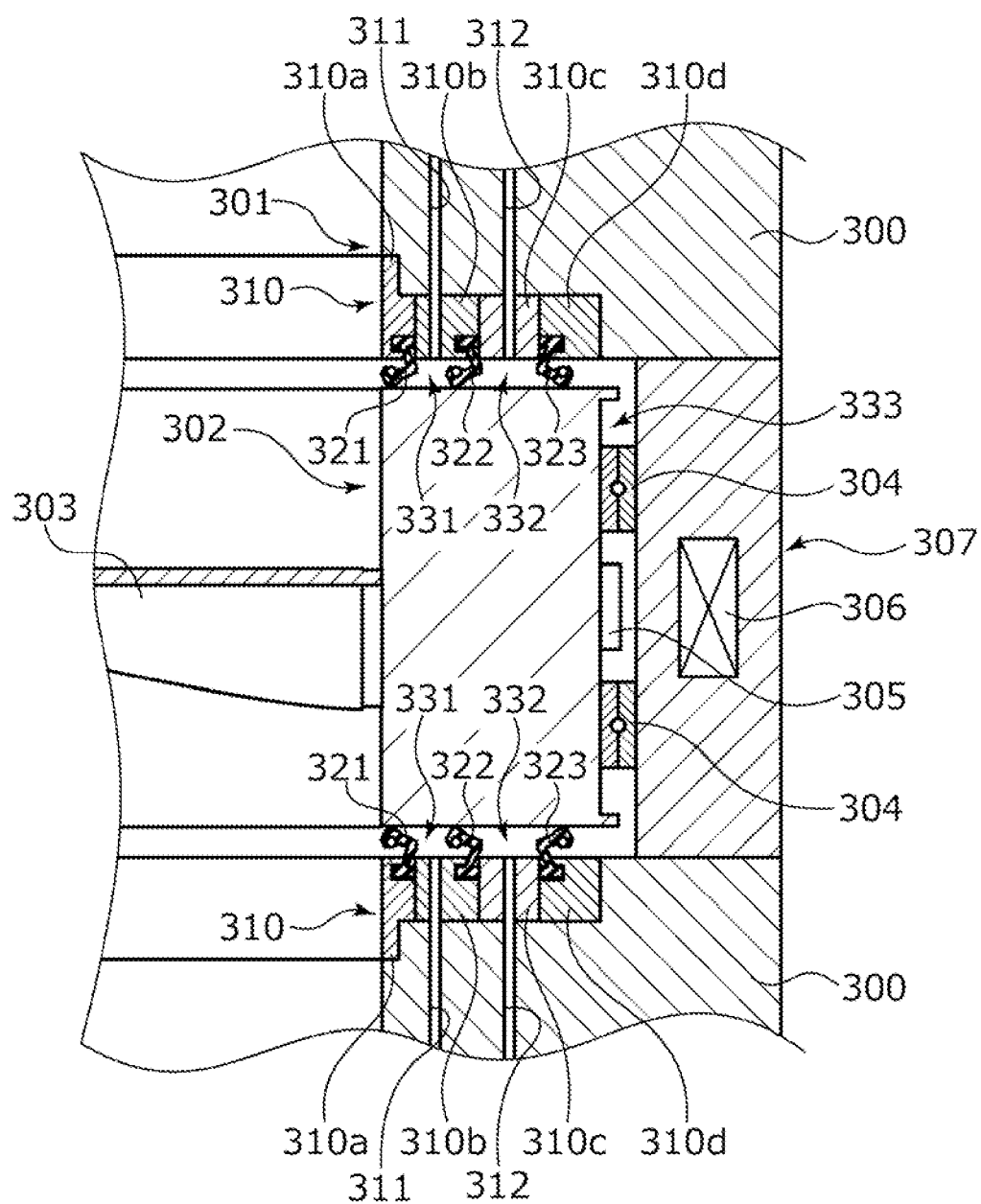
FIG. 6 is an enlarged schematic view showing a seal device according to a third embodiment of the present invention.

As shown in FIG. 6, a first divided housing 310a, a second divided housing 310b, a third divided housing 310c, and a fourth divided housing 310d in order from the inner diameter side are fitted to one another and are integrally connected with one another by bolts or the like (not shown), so that the housings 310, 310 are each formed into a substantially cylindrical shape. The housings 310, 310 are fixed by bolts or the like (not shown) with respective flange portions of the first divided housings 310a, 310a on inner diameter side being fitted to the inner peripheral surfaces of the casings 300, 300.

Further, in each of the housings 310, 310, one end portion of the first lip seal 321 is held in a substantially sealed manner between the first divided housing 310a and the second divided housing 310b, one end portion of the intermediate lip seal 322 is held in a substantially sealed manner between the second divided housing 310b and the third divided housing 310c, and one end portion of the second lip seal 323 is held in a substantially sealed manner between the third divided housing 310c and the fourth divided housing 310d. Further, a first annular chamber 331 is formed between the first lip seal 321 and the intermediate lip seal 322, and a second annular chamber 332 is formed between the intermediate lip seal 322 and the second lip seal 323. Further, an annular oil chamber 333 is formed between the second lip seal 323 and the bearing 304.

Further, through holes are formed in the second divided housings 310b, 310b to constitute a part of the first air supply passages 311, 311 communicating with the air control unit 120 provided in the interior of equipment and the first annular chambers 331, 331 as gas chambers.

Further, through holes are formed in the third divided housings 310c, 310c to constitute a part of the second air supply passages 312, 312 communicating with the air control unit 120 and the second annular chambers 332, 332 as intermediate chambers.

As described above, in the seal device 301 according to this embodiment, the compressed air, whose pressure has been reduced to the air pressure $P_2$ by the air control unit 120 so as to be lower than the air pressure $P_1$ of the compressed air supplied to the first annular chambers 331, 331 through the first air supply passages 311, 311, is supplied to the second annular chambers 332, 332 through the second air supply passages 312, 312. Accordingly, in case of failure in which the lubricating oil in the oil chamber 333 in the interior of equipment, which faces the second lip seals 323, 323, enters the second annular chambers 332, 332 through the second lip seals 323, 323, the lubricating oil that has entered the second annular chambers 332, 332 and has the air pressure $P_2$ lower than that in the adjacent first annular chambers 331, 331 on the equipment exterior side can be stored, and the lubricating oil can be reliably prevented from leaking to the outside of the ship.

Although the embodiments according to the present invention have been described above with reference to the drawings, the specific configurations are not limited to these embodiments, and any changes or additions within the scope of the gist of the present invention are included in the present invention.

For example, it goes without saying that in the seal device according to the embodiments described above, not only the lubricating oil but also the seawater W that has entered from the outside of equipment can be collected in the second annular chamber as the intermediate chamber. Further, the external fluid is not limited to seawater, and may be, for example, freshwater. Further, the sealed fluid is not limited to lubricating oil.

Further, in the embodiments described above, the air control unit 120 has been described as being configured to reduce the pressure of the compressed air with the pressure reducing valves 122, 123, but the present invention is not limited to this, and various pressure control valves such as a relief valve may be used to reduce the pressure of the compressed air. Further, the compressed gas is not limited to compressed air.

Further, in the first and second embodiments, the mode in which the lip seals are in sliding contact with the outer peripheral surface of the liner 4 fitted onto the propeller shaft 2 has been described, but the present invention is not limited to this, and the lip seals are directly in sliding contact with the outer peripheral surface of the propeller shaft 2. Further, in the embodiments described above, each sealing part is not limited to one composed of a lip seal.

Further, in the third embodiment described above, the seal device 301 applied to the center-open type tidal current generator has been described, but, for example, the seal device having the configuration according to the first or second embodiment may be applied to a turbine type tidal current generator.

REFERENCE SIGNS LIST

1 Seal device
2 Propeller shaft (second member)
4 Liner
10 Housing (first member)
11 First air supply passage
12 Second air supply passage
13 Third air supply passage
14 Communication passage
21 First lip seal (first seal part)
22 Intermediate lip seal (intermediate seal part)
23 Second lip seal (second seal part)
24 Auxiliary lip seal
31 First annular chamber (gas chamber)
32 Second annular chamber (intermediate chamber)
33 Oil chamber
34 Second oil chamber
100 Stern tube
120 Air control unit
122, 123 Pressure reducing valve
130 Lubricating oil circulation unit
131 Lubricating oil tank
132 First lubricating oil circulation passage
133 Second lubricating oil circulation passage
134 Pump
140 Collection unit
141 Collection chamber
142 Check valve
201 Seal device
210 Housing (first member)
230 Lubricating oil circulation unit
231 Lubricating oil tank
234 Branch communication passage
300 Casing
301 Seal device
302 Rotor (second member)
307 Power generation unit
310 Housing (first member)
311 First air supply passage
312 Second air supply passage
321 First lip seal (first seal part)
322 Intermediate lip seal (intermediate seal part)
323 Second lip seal (second seal part)
331 First annular chamber (gas chamber)
332 Second annular chamber (intermediate chamber)
333 Oil chamber

The invention claimed is:

1. A seal device provided at a portion where relative rotation occurs between a first member and a second member that rotates relative to the first member, comprising a first seal part facing an external fluid and a second seal part arranged in parallel to the first seal part and facing a sealed fluid in an interior of equipment to prevent entry of the external fluid and leakage of the sealed fluid, wherein
the seal device further comprises an Intermediate seal part arranged in parallel to the first seal part and the second seal part between the first seal part and the second seal part,
a gas chamber is formed between the first seal part and the intermediate seal part, to which a gas having a higher pressure than the external fluid is supplied, and
an intermediate chamber is formed between the intermediate seal part and the second seal part, to which a gas having a lower pressure than the gas supplied to the gas chamber and having a lower pressure than the sealed fluid is supplied, and
the intermediate chamber and the gas chamber adjoining one another.

2. The seal device according to claim 1, wherein
the second seal part is a lip seal, and is arranged so that a lip portion thereof is pressed against the second member by the sealed fluid.

3. The seal device according to claim 2, wherein
the intermediate chamber communicates with a collection chamber through a communication passage.

4. The seal device according to claim 3, wherein
the communication passage is provided with a check valve that prevents backflow to a side of the intermediate chamber.

5. The seal device according to claim 2, wherein
the gas supplied to the intermediate chamber is a pressure-controlled compressed gas.

6. The seal device according to claim 5, wherein the compressed gas is compressed air.

7. The seal device according to claim 2, wherein the sealed fluid is controlled to have a lower pressure than the external fluid.

8. The seal device according to claim 1, wherein the intermediate chamber communicates with a collection chamber through a communication passage.

9. The seal device according to claim 8, wherein the gas supplied to the intermediate chamber is a pressure-controlled compressed gas.

10. The seal device according to claim 9, wherein the compressed gas is compressed air.

11. The seal device according to claim 8, wherein the sealed fluid is controlled to have a lower pressure than the external fluid.

12. The seal device according to claim 8, wherein the communication passage is provided with a check valve that prevents backflow to a side of the Intermediate chamber.

13. The seal device according to claim 12, wherein the gas supplied to the intermediate chamber is a pressure-controlled compressed gas.

14. The seal device according to claim 13, wherein the compressed gas is compressed air.

15. The seal device according to claim 12, wherein the sealed fluid is controlled to have a lower pressure than the external fluid.

16. The seal device according to claim 1, wherein the gas supplied to the intermediate chamber is a pressure-controlled compressed gas.

17. The seal device according to claim 16, wherein the compressed gas is compressed air.

18. The seal device according to claim 16, wherein the sealed fluid is controlled to have a lower pressure than the external fluid.

19. The seal device according to claim 1, wherein the sealed fluid is controlled to have a lower pressure than the external fluid.

\* \* \* \* \*